THIN LAYER CHROMATOGRAPHIC METHOD AND APPARATUS

Filed June 14, 1971 5 Sheets-Sheet 1

INVENTOR.
LLOYD R. SNYDER
DENNIS L. SAUNDERS
BY
ATTORNEY

INVENTORS
LLOYD R. SNYDER
DENNIS L. SAUNDERS
BY
[signature]
ATTORNEY

THIN LAYER CHROMATOGRAPHIC METHOD AND APPARATUS

INVENTORS
LLOYD R. SNYDER
BY DENNIS L. SAUNDERS
Thomas S. Henderson
ATTORNEY

THIN LAYER CHROMATOGRAPHIC METHOD AND APPARATUS

Filed June 14, 1971 5 Sheets-Sheet 4

INVENTORS
LLOYD R. SNYDER
DENNIS L. SAUNDERS
BY
ATTORNEY

INVENTORS
LLOYD R. SNYDER
DENNIS L. SAUNDERS
BY [signature]
ATTORNEY 3,823,087

THIN LAYER CHROMATOGRAPHIC METHOD AND APPARATUS

Lloyd R. Snyder, Placentia, and Dennis L. Saunders, Anaheim, Calif., assignors to Union Oil Company of California, Los Angeles, Calif.

Filed June 14, 1971, Ser. No. 152,565
Int. Cl. B01d *15/08*
U.S. Cl. 210—31 C 29 Claims

ABSTRACT OF THE DISCLOSURE

Compounds are rapidly and efficiently separated from combinations thereof by a thin layer chromatographic method in which solvent is removed from the adsorbent after a predetermined travel substantially shorter than the total travel of the solvent during separation relative to said adsorbent, and the adsorbent is moved during said separation relative to the points of solvent addition and removal in the direction opposite the direction of solvent flow. In another embodiment the adsorbent can be employed as a continuous endless strand and recycled during separation.

BACKGROUND OF THE INVENTION

Thin layer chromatography, in its several forms, has found substantial although not extensive application as an analytical expedient for the separation of a wide variety of compositions. These separation procedures take advantage of the dissimilarities in distribution coefficients between solvent and adsorbent exhibited by the different compounds contained in the composition under investigation. Generally the solvent is passed along a sheet or strand of adsorbent under the influence of natural physical forces, e.g., capillary action, or applied forces such as those existing during centrifugation. Thin layer chromatographic (TLC) procedures which have been the subject of previous investigations include normal TLC, multiple development TLC, continuous development and centrifugal TLC. These several procedures will be discussed hereinafter in more detail.

As is in the case in all known processes and with all known forms of apparatus the systems are subject to limitations that derive from inherent characteristics of the methods employed or the apparatus required to effect the necessary process steps. The more significant variables and objectives involved in thin layer chromatographic techniques are solvent migration rate, continuity or variability of solvent migration rate, the degree and rapidity of sample resolution, limitations imposed by the length and design of adsorbent, sample component smearing or elution during separation, maximum sample size limitations, and the size, complexity and variability of apparatus employed to control these several parameters.

We have now discovered a procedure and apparatus whereby the effectiveness and utility of thin layer chromatography as both an analytical tool and a means of component separation can be greatly enhanced. We have found that with these systems markedly higher solvent migration rates can be obtained, faster and/or more complete sample resolution can be achieved, sample migration rates can be maintained at constant levels or can be controlled in a predetermined variable manner, and higher maximum sample sizes can be employed. In addition, these procedures and the several forms of apparatus employed to effect the essential steps of these processes enable the reuse or recycle of adsorbent during either single batch separation or continuous separations. The essential steps of these concepts are easily carried out on relatively simple compact apparatus which is much more easily controlled to obtain the desired effects than might otherwise be expected in view of the relative complexity of the variables and objectives involved.

It is therefore one object of this invention to provide an improved thin layer chromatographic process and apparatus. Another object of this invention is the provision of TLC methods and systems in which dramatically higher solvent migration rates are obtainable. Yet another object of this invention is the provision of a method and apparatus by which solvent migration rates can be maintained at a constant level during TLC separation. Another object of this invention is the provision of TLC systems which enable the maintenance of either constant solvent migration rates or solvent rates which are variable in a controlled predetermined manner. Another object is the provision of a thin layer chromatographic technique which affords faster and/or more complete resolution of sample constituents. In accordance with another object there is provided a thin layer chromatographic method and apparatus which enables the use of markedly higher sample sizes and/or more definitive sample component resolution. Another object of this invention is the provision of a thin layer chromatographic separation system which enables the recycle of adsorbent during either batch or continuous separation. In accordance with yet another object there is provided a thin layer chromatographic separation system with which relatively difficult separations can be rapidly performed at high resolution and increased solvent rates with a relatively small amount of adsorbent material.

These and other objects and aspects of this invention will be apparent to one skilled in the art in view of the disclosure and claims.

In accordance with one embodiment of this invention one or more compounds are separated from a combination thereof with at least one other component by thin layer chromatography, wherein the one or more compounds thus separated are at least partially soluble in the solvent and at least partially adsorbed on the adsorbent and have different distribution coefficients between the solvent and adsorbent, by contacting the sample at a first location on the adsorbent with a solvent passed upwardly along the adsorbent by capillary action and added to the adsorbent at a second location below the sample level whereby each of the compounds to be separated are carried along the adsorbent by the solvent at different relative rates proportional to the distribution coefficients of each component. The solvent is removed from the adsorbent at a third level above the sample location at a distance above the solvent addition point of less than the total solvent travel distance during the separation. These conditions are maintained while moving the adsorbent downwardly relative to the points of solvent addition and removal at a rate not substantially greater than the upward migration rate of at least a selected one of said components whereby the selected component is maintained above the solvent addition point.

In accordance with another embodiment the adsorbent is moved downwardly relative to the solvent addition and removal points at a rate equal to or at least approximating the migration rate of at least two compounds in said sample such that those two compounds are retained between the levels of solvent addition and removal.

In accordance with yet another embodiment of this invention the adsorbent employed during the separation comprises a continuous endless strand of adsorbent. A further modification of this latter embodiment involves reusing at least a portion of the adsorbent by recycling the adsorbent during separation. This procedure is particularly advantageous in that much higher degrees of resolution can be obtained with a given amount of adsorbent or, conversely, much smaller amounts of adsorbent and apparatus of reduced size can be employed to obtain separations otherwise possible only with larger amounts of adsorbent material.

In accordance with another embodiment of this invention the relative position of the described solvent addition and solvent removal levels is varied in a manner and to a degree proportional to the separation of at least two sample components whereby the spacing between the solvent addition and removal points is gradually increased as the separation progresses in proportion to the separation of two or more of the components under investigation.

In accordance with yet another embodiment the spacing between the levels of solvent addition and removal is maintained substantially constant throughout the separation whereby the solvent migration rate along said adsorbent is maintained at a relatively constant value.

In accordance with another embodiment an apparatus for separating two or more compounds having different distribution coefficients between selective adsorbent and solvent by solvent-adsorbent chromatography includes a traveling elongate adsorbent strand, e.g., sheet, filament, laminate, matrix, etc., movably mounted with respect to its major axis past two different points of solvent addition and solvent removal. The direction of travel of the adsorbent strand preferably has a major vector in the vertical plane with the point of solvent addition being below the point of solvent removal. The rate of adsorbent travel is controlled in proportion to the rate of solvent and sample migration by any suitable controlled drive means such as a suitably geared electrical motor.

Due to the characteristics of the apparatus and process as discussed hereinafter in more detail, the spacing between the levels of solvent addition and removal should be less than about half the total travel of the adsorbent during the separation. The higher preferred migration rates are obtained when the spacing between these two levels is on the order of less than about 10 centimeters and preferably less than about 5 centimeters, at least during the earlier stages of separation. This spacing must of course be increased if and when it is desirable to retain two or more sample components on the adsorbent and the distance between those components approaches or exceeds the noted spacing dimensions.

A large variety of operating systems can be employed in thin layer chromatographic separations. Many such systems have been studied by previous investigators and are referred to only briefly herein. The most significant parameters include solvent composition, adsorbent properties—both chemical and physical, solvent migration rate, and the selected mode of operation. All of these parameters can be varied throughout wide limits providing a great number of options and a considerable degree of adaptability to any specific problem. The choice of each of these variables and the combination employed in any given instance will of course be dictated by the objectives of adequate component resolution, run length in batch operation, the degree of component smearing, and the like.

Despite the versatility of previously available thin layer chromatographic systems, they are all fundamentally limited due to characteristics inherent in the methods and apparatus employed with respect to many or all of the more significant system parameters including solvent migration rates, rapidity of resolution, and the maximum sample sizes which the system could handle. They also do not provide the opportunity of reusing adsorbent during a single separation or the versatility afforded by forms of apparatus to which the methods of this invention are adaptable.

The list of solvents that can and have found utility in thin layer chromatography is almost endless and covers the spectrum from water to complex organic compounds. Compounds most commonly employed, depending of course upon the adsorbent and sample composition, include paraffins, cycloparaffins, alcohols, organohalides, amines, amides, carboxylic acid, alcohols including mono and polyhydroxy organo compounds, ketones, aldehydes, sulfoxides, ethers, aromatics, thiols, and many more. In some instances it is desirable to employ a combination of two or more of these materials as a selective solvent.

The properties of several compositions which find utility as solvents in thin layer chromatographic systems are discussed by Lloyd R. Snyder in "Principles of Adsorption Chromatography," Dekker, New York, 1968. Exemplary of these solvents are acetic acid, methanol, ethylene glycol, isopropanol, pyridine, butyl Cellosolve, nitromethane, diethyl amine, aniline, dimethyl sulfoxide, ethyl acetate, dioxane, acetone, 1-nitropropane, ethylene dichloride, tetrahydrofurane, chloroform, ethyl sulfite, ethyl ether, benzene, chlorobenzene, fluoroalkanes, normal hexane, butane, petroleum ether, n-decane, cyclopentane, carbon disulfide, amyl chloride, xylene, and the like.

A similar degree of choice is afforded in the selection of adsorbents. As is the case with solvents, adsorbents must be selected in view of the compositions to be separated, the solvents employed, and, at least to some extent, the characteristics of the separation procedures employed. The properties of several suitable adsorbents are discussed by Lloyd R. Snyder, supra. The interrelationship of adsorbents and solvents and the selection of these parameters in view of sample compositions are also discussed in the same text and need not be elaborated upon extensively herein. Briefly, however, adsorbents are generally characterized as either nonpolar, polar, acidic, or basic. In addition, a single adsorbent may contain both basic and acidic sites if desired. Exemplary nonpolar adsorbents include graphatized charcoal and dehydroxylated silicas. Dispersion forces are the primary controlling factor by which these nonpolar adsorbents effect the performance of any given thin layer chromatographic system. Illustrative of polar adsorbents which preferentially adsorb polar compounds, are metal oxides such as silica, alumina, magnesia, titania, and the like and combinations thereof. Oxidized charcoals also have utility in the separation of polar materials. Illustrative of acidic adsorbents which preferentially adsorb basic components are Florisil, silica and magnesia. The most popular basic adsorbents which preferentially adsorb acidic constituents include alumina and magnesia.

The operation and advantages of these procedures can be best understood by comparison of those methods to previously available thin layer chromatographic systems. These descriptions and comparisons are facilitated by reference to the drawings. FIGS 1 through 9 are schematic illustrations of normal development, solvent advance development and the concept of the invention—adsorbent advance development TLC. The procedures of this invention are also alternatively referred to as drum thin layer chromatography (drum-TLC).

Figure 1:
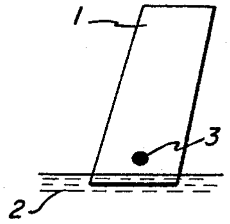
FIG. 1 PRIOR ART

The resolution $R_s$ of a pair of adjacent bands A and B in normal TLC has been shown to be related to certain fundamental parameters by Lloyd R. Snyder, "Principles of Adsorption Chromatography," Dekker, New York, 1968 and J. Chromatographic Science, *7*, 352 (1969). These relationships indicate that for normal TLC $$R_s=(1/4)[(k_a/k_b)-1]\sqrt{NR_F}(1-R_F) \quad (1)$$
$$=(1/4)[(k_a/k_b)-1]\sqrt{NQ^2} \quad (1a)$$

wherein $k_a$ and $k_b$ are partition ratios for bands A and B, respectively. Partition ratio is defined as the concentration of each respective component in the stationary phase to the concentration of the same component in the solvent phase. N is the number of theoretical plates between the point of sample application and the solvent front, and $R_F$ refers to the average $R_F$ value for bands A and B. The quantity $NQ^2$ is the number of so-called effective plates in the separation. Eqn. 1 shows that resolution in TLC is controlled by three factors that can be varied more or less independently for optimum resolution: separation selectivity ($k_a/k_b$), separation efficiency N, and band migration rates $R_F$.

For separations at room temperature (this includes almost all TLC separations) selectivity is controlled by the compositions of the solvent and stationary phase. Separation efficiency is a function of: stationary phase composition and particle size, the way in which the bed is prepared, the viscosity and migration rate of the solvent, and the total bed length. In most cases no attempt is made to vary separation efficiency in TLC. Instead a set of standardized—near optimum—conditions are used for every separation. Band migration rates are usually controlled by varying the solvent composition, strong solvents giving faster band migration rates for all components. In normal TLC it can be shown that an optimum value of $R_F$ is equal to 1/3. A general review of these relationships is provided in "Principles of Adsorption Chromatography" supra.

Variation of the above experimental conditions in normal TLC (one-dimensional, single development with fixed experimental conditions throughout separation) is sometimes unsuccessful in separating a given sample. In these cases we must consider other separation techniques. Thus, samples which contain many components of widely varying migration rates are subject to the "general elution problem," in which poor separation results for both rapidly and slowly moving bands. This has given rise to a large number of special techniques and associated equipment (e.g., two dimensional TLC, gradient elution TLC, gradient layer TLC, vapor programmed TLC, etc.). The theory of this class of separatioas has recently been treated by L. R. Snyder and D. L. Saunders, Journal of Chromatography, *44*, 1 (1969). An approximate basis now exists for their understanding and optimization.

Another separation problem arises when two sample bands are unresolved despite all attempts at maximizing selectivity (and with $R_F$ optimum at ~1/3). In this case our only alternative is to increase N of $NQ^2$. The techniques usually used for this purpose are multiple development and continuous development TLC. Multiple development consists of repeated separations on the same plate, with drying of the plate between each development. The $R_F$ value for the band pair in question is lowered to less than the normally optimum value of 1/3, and the total migration of the bands after several developments is greater than for one development with $R_F=1/3$. In this way the product $NQ^2$ of equation 1a can be increased significantly. Continuous development is similar in principle, consisting of removal of solvent at the end of the plate during separation. In the same way as in multiple development, $R_F$ can be lowered, total migration distance increased, and resolution improved as discussed in "Principles of Adsorption Chromatography." It is obvious that multiple and continuous devolpment TLC each involve a considerable increase in separation time and effort. Total resolution or number of effective plates is increased, but effective plates per unit time are usually less than in normal TLC. Other approaches to increased separation efficiency in TLC have been available (but little used) for many years: increase in plate lengths, decrease in adsorbent particle size discussed by E. Cremer, T. Kraus, and H. Nau, Z. Anal. Chem., *245*, 37 (1969) and centrifugal chromatography discussed by J. Rosmus, M. Parlicek, and Z. Deyl, in "Thin-Layer Chromatography," G. B. Marini-Bettolo, ed., Elsevier, Amsterdam, 1964, p. 119.

Figure 2:
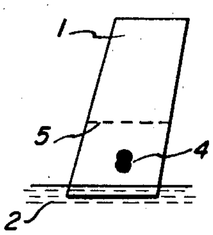
FIG. 2 PRIOR ART
Figure 3:
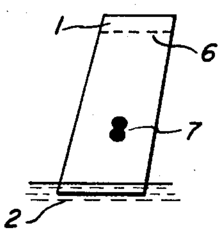
FIG. 3 PRIOR ART

There is a basic problem in maximizing effective plates per unit time in TLC (particularly for large values of $NQ^2$) which the above techniques have been unable to overcome. First, a large value of $NQ^2$ requires a large value of N, which means that the two bands of interest must migrate to a relatively large distance across the bed or plate. Furthermore, $R_F$ must be of the order of 1/3 (or less) during this migration, which means that the distance migrated by the solvent is several times greater. Second, the rate of solvent advance across the plate is inversely proportional to the distance between the solvent source and the solvent front on the plate. This means that large migration distances for the two bands recessarily result in slow solvent migration rates as illustrated in FIGS. 1 through 3. These figures are schematic illustrations of normal TLC operation. In FIG. 1 the separation of sample 3 is commenced by placing the rectangular adsorbent sheet 1 into contact with solvent bath 2. During an intermediate stage of the separation illustrated in FIG. 2 the solvent has migrated past the now partially separated sample 4 to an intermediate level 5. At the end of the separation (FIG. 3) the solvent has migrated up the absorbent sheet to a predetermined level 6 leaving the sample bands, two in this case, indicated by numeral 7, only partially separated.

In liquid chromatography it is generally true that a reduction in solvent velocity in a particular system means a loss in effective plates per unit time. These factors are considered by L. R. Snyder, J. Chromatographic Sci., supra. Thus if a significant increase in separation efficiency per unit time is to be obtained in TLC, we must somehow provide large sample migration distances at relatively high solvent flow rates.

Figure 4:
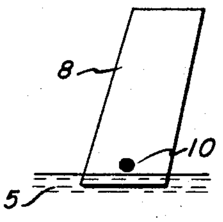
Figure 5:
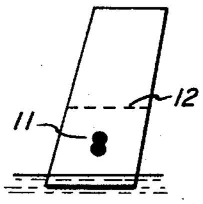
Figure 6:
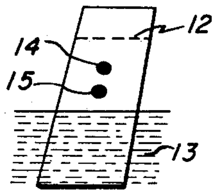

By comparison, the adsorbent advance methods of this invention enable large migration distances at high solvent flow rates, thereby resulting in greatly increased resolution and/or decreased separation time. The basic principle of the method involves an advance of the solvent source along the plate, immediately behind the two bands in question, with simultaneous removal of solvent just ahead of the two bands as illustrated in FIGS. 4 through 6. In FIG. 4 the separation is commenced in a manner similar to normal TLC by contacting adsorbent sheet 8 having sample 10 deposited thereon slightly above the initial solvent level with a source of solvent such as that provided in this instance by solvent bath 9. It should be understood that the solvent can be added to the adsorbent by any one of a number of means such as by injection through a nozzle or slot in contact with or immediately adjacent the adsorbent sheet. The adsorbent can be maintained in the same relative position with respect to the solvent bath 9 until the solvent has migrated up the adsorbent sheet to a predetermined level 12. During the course of this migration some separation results in the different sample bands indicated by numeral 11. The adsorbent sheet is then preferably passed downwardly into the solvent bath resulting in the immersion of the lower extremity of the adsorbent sheet 13. The rate at which the adsorbent sheet is lowered relative to the point of solvent addition, i.e., the level of solvent bath 9, is preferably controlled so as to maintain the slower moving of the components under investigation, i.e., the component indicated by numeral 15 in FIG. 6, above the solvent addition level. At the same time the solvent which migrates upwardly along the adsorbent sheet is removed by evaporation, adsorption or similar means at predetermined level 12 whereby a constant solvent head Z is maintained as prescribed by the elevation difference between solvent removal level 12 and the level of the solvent bath. In the embodiment illustrated in FIGS. 4, 5 and 6 the elevation of solvent removal 12 has been selected so as to assure that the fastest removing component 14 is maintained below level 12 by the relative downward motion of absorbent sheet 8. Several of these conditions are not essential to the concept of this invention and will be elaborated upon further hereinafter. In this way the distance between solvent source and front is kept small (permitting large solvent velocities) and the two bands can simultaneously advance any desired distance along the plate (limited only by plate length).

Figure 7:
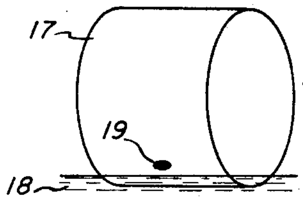
Figure 8:
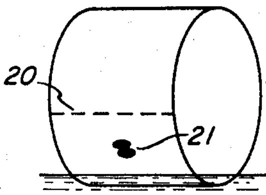
Figure 9:
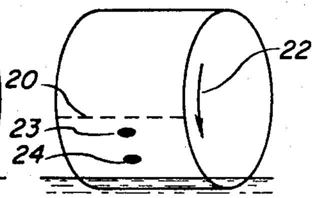

In practice this same operation is more readily achieved by coating a revolvable drum wth the desired stationary phase. After application of the sample and addition of solvent to the unit (as in normal TLC), the drum is rotated during separation in such a way, and at such a rate, as to keep the two sample bands of interest just above the solvent surface as shown schematically in FIGS. 7, 8 and 9. The presently preferred embodiment of this invention is illustrated in FIGS. 7 through 9 which is a sequential schematic representation of a drum-shaped or cylindrical adsorbent sheet 17 during the simple separation of a two-component sample. The initiation of the separation is illustrated in FIG. 7 wherein the adsorbent drum 17 having sample 19 disposed thereon is contacted with a solvent source such as solvent bath 18. The drum is maintained in a stationary position until the solvent has migrated upwardly along the adsorbent past the sample to a predetermined (FIGS. 8 and 9). At that point the removal of solvent from level 20 by evaporation, adsorption or the similar means is commenced so as to maintain a constant solvent head determined by the difference in elevation between solvent removal level 20 and the solvent addition level prescribed by the level of solvent bath 18. Simultaneously the drum is rotated in the direction indicated by arrow 22 as illustrated in FIG. 9 whereupon further separation of the two component bands 23 and 24 is effected. Thus the migration rate of the two bands upward can be exactly counteracted, if desired, by the downward motion of the drum. At the same time solvent is continuously removed from the drum just above the migrating pair of bands, so as to keep the solvent front close to the solvent surface. In this way we obtain high solvent flow rates, and an unlimited length of plate is available for extended band migration. It should also be emphasized that drum TLC is not simply a substitute for adjustments in the stationary phase or solvent. Whatever improvements in resolution can be achieved by varying the stationary phase and solvent will be further multiplied by the technique of drum TLC.

THEORY OF SEPARATION EFFICIENCY FOR DIFFERENT TLC TECHNIQUES

Our approach to understanding the relative performance of various TLC techniques begins with equation 1, supra. The major approximation in this relationship is the assumed independence of selectivity $k_a/k_b$ and $R_F$, and this is of minor importance for the present class of techniques (where $R_F$ is usually not varied over wide limits). Equation 1 also assumes narrow, closely adjacent bands (A and B), but this is also an acceptable approximation in the present discussion.

Previous treatments of normal TLC, continuous or multiple development TLC, etc. have usually begun with the approximation of constant N (and H) throughout separation. This is a more serious approximation. The usual alternative to constant H in TLC is the assumption of the Van Deemter relationship:

$$H=A+B/v+Cv \qquad (2)$$

discussed by G. H. Stewart, Separation Sci., *1*, 747 (1966). Here A, B and C are constants for a particular TLC system, and $v$ is solvent velocity (cm./sec.). Equation 2 has not been adequately verified for TLC systems, and in corresponding liquid column chromatography systems this relationship is a poor approximation to experimental data when $v$ is varied over wide limits as observed by J. L. Waters, J. N. Little and D. F. Horgan, J. Chromatog. Sci., 7, 293 (1966) and L. R. Snyder, J. Chromatographic Sci., supra. Since $v$ varies markedly during the course of a normal TLC separation (by over a factor of 10), there is reason to doubt the suitability of Equation 2 as a description for TLC systems. Similarly there is no compelling reason to believe that separation by TLC is essentially different from analogous separations by liquid column chromatography. For the latter separations H can be approximated with considerable precision over a wide range in $v$ values by the impirical relationship $$H=Dv^n, \qquad (3)$$

where D and $n$ are constants for a particular column and system (sample, solvent, etc.) and $0.2 \leq n \leq 0.6$. For liquid-solid column chromatography $n$ is usually close to 0.4, so that $$H=Dv^{0.4}. \qquad (3a)$$

Similarly D can be related empirically to adsorbent particle diameter $d_p$ as $$D=12d_p^{0.8}. \qquad (3b)$$

We will assume equations 3a and 3b in the present discussion. In justification of these approximations we will show that these relationships predict H values in TLC which are close to experimental values.

Another relationship required in our treatment is that between solvent migration rate $v$ and the distance of solvent advance $z_s$. Theoretically and experimentally this is found to be of the form $$z_s^2=kt \qquad (4)$$

or $$v=(1/2)k/z_s. \qquad (4a)$$

Here $t$ is the time separation (from the beginning to the end of solvent migration), $k$ is a constant for a particular TLC system, and $z_s$ is the distance between the solvent source and solvent front. $v$ is inversely proportional to $z_s$ in TLC, just as $y$ is inversely proportional to column length in column chromatography. For typical TLC separations we have separation times of about one hour and a total solvent advance of about 15 cm. This suggests an average value of $k$ (from eqn. 4) of about 0.06 cm.²/sec. As observed by L. R. Snyder in J. Chromatographic Sci., supra, $k$ will vary with adsorbent particle size, approximately as $d_p^{-1.7}$.

The average value of H throughout separation is obtained from the usual relationship given by J. C. Giddings, "Dynamics of Chromatography," Dekker, New York, 1965. Thus:

$$H=\frac{\int_{z_o}^{z_f} H_i dz}{\int_{z_o}^{z_f} dz} \qquad (5)$$

Here $H_i$ refers to an instantaneous value of H (calculable from equation 3a), $z_o$ is the initial distance of the sample spot from the solvent source, and $z_f$ is the final distance of the two bands (A and B) from the solvent source.

NORMAL TLC

The average value of H, the total number of plates M, and the equivalent number of total effective plates in normal TLC are obtained from equations 1a and 5 substituting $R_F dz_s$ for $dz$ and $D(k/2)^{0.4}z_s^{-0.4}$ for $H_i$ from equations 3a and 4a. Thus:

$$H=\left[\frac{D(K/2)^{0.4}}{0.6}\right]\left[\frac{(Z^{0.6}-z_o^{0.6})}{(Z-z_o)}\right]. \quad (6)$$

The total number of plates N between $z_o$ and Z is given as $(Z-z_o)/H$ or $$N=\left[\frac{0.6}{D(k/2)^{0.4}}\right]\left[\frac{(Z-z_o)^2}{(Z^{0.6}-z_o^{0.6})}\right]. \quad (7)$$

Effective plates $NQ^2$ from equation 1a are now given as $$NQ^2=NR_F(1-R_F)^2. \quad (8)$$

with N given by equation (7).

For a given solvent advance $(Z-z_o)$ (Z is the value of $z_s$ at the end of the separation), H is a function only of D, $k$, $z_o$ and Z (Equation 6). This is equivalent to constant H throughout separation from the standpoint of optimizing $NQ^2$ with respect to $R_F$, so that the optimum value of $R_F$ in normal TLC is equal to 1/3 (derivable from equation 8, just as in reference 1 assuming H constant). The dependence of $NQ^2$ on the ratio $z_o/Z$ can be derived from equation 7.

$$N=\left[\frac{0.6Z^{1.4}}{D(k/2)^{0.4}}\right]\left[\frac{(1-z_o/Z)^2}{(1-[z_o/Z]^{0.6})}\right] \quad (9)$$

Figure 10:
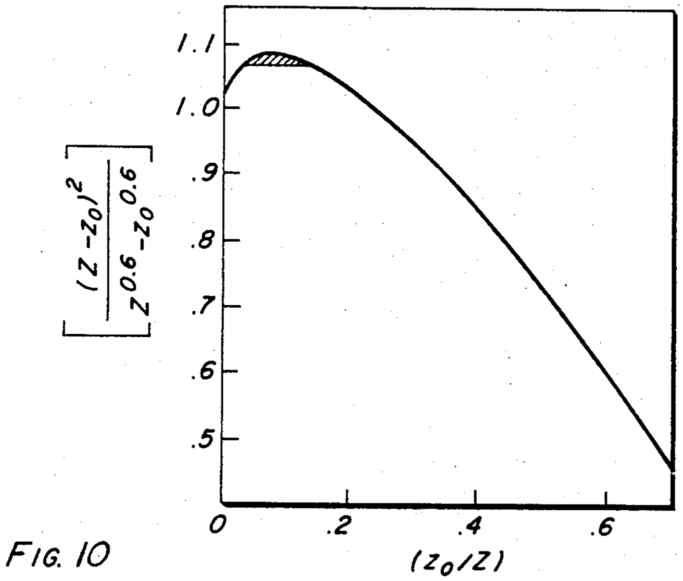
FIG. 10 is a plot of the calculated sample resolution factor versus the ratio of initial and final sample distance from the solvent source.

The function on the extreme right of equation 9 is plotted vs. $z_o/Z$ in FIG. 10, and it is seen that optimum resolution is obtained for $z_o/A$ values between 0.03 and 0.14. This range brackets the values of $z_o/Z$ used by most chromatographers. E. Stahl, "Thin-Layer Chromatography. A Laboratory Handbook," Academic Press, New York, 1965, recommends a value of 0.1. The calculation of FIG. 10 assumes rapid equilibration of sample between solvent and stationary phase as the solvent sweeps past the point of initial sample application. If this is not the case the optimum value of $z_o/Z$ will be shifted to higher values, corresponding to lower solvent velocities at the time solvent first contacts the sample on the plate.

For TLC separations on 10–40$\mu$ silica, F. Geiss, personal communication reports H values of 0.005–0.01 cm. From equations 6, 3b and the previously calculated value of $k$ (0.06), we calculate H values of 0.01–0.03 cm. for this case. The latter values also bracket most values of H reported by other workers; e.g., 0.013–0.017 cm. reported by L. R. Snyder, Anal. Chem., *39*, 705 (1967). From these various comparisons it appears that the present approach to estimating bed efficiencies in TLC provides values that are close to those observed experimentally. The only exception we can foresee is for very fine adsorbent particles, where the $B/v$ term of the Van Deemter equation (eqn. 2) will eventually make a significant contribution. Data of Stewart, supra, and calculations based on empirical expressions for diffusion coefficients discussed in "Principles of Adsorption Chromatography" supra, suggest that equation 3a will significantly underestimate H values in TLC when average particle diameters are less than 10$\mu$. This point is further clarified in the subsequent discussion of the adsorbent advance systems of this invention.

Figure 11:
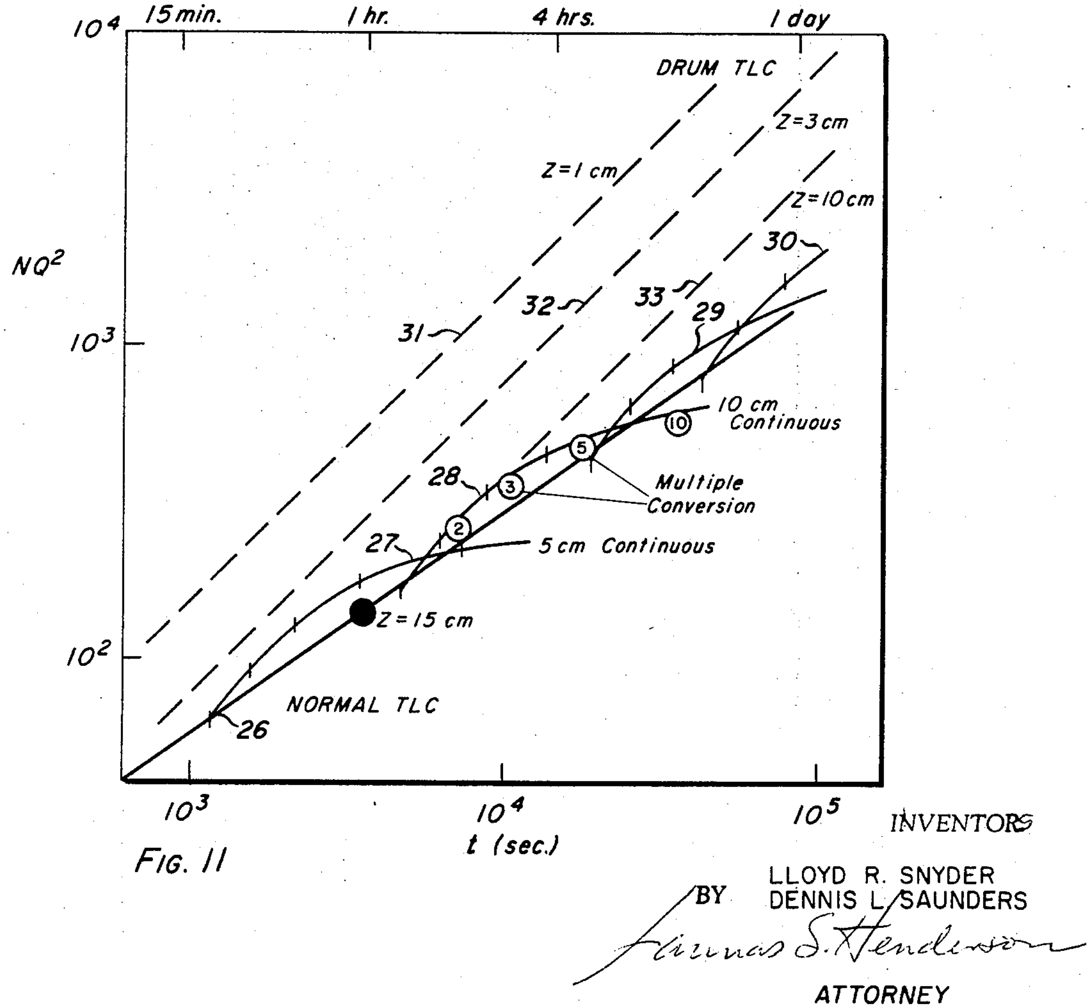
FIG. 11 is a calculated plot verified by experimental results of the degree of separation indicated by the equivalent number of effective plates ($NQ^2$) versus separation time.

FIG. 11 is a plot of calculated values of $NQ^2$ for normal TLC as a function of varying Z (variable plate length): the heavy, solid line 26. A typical TLC system is assumed ($d_p$ equal 20$\mu$, $k$ equal 0.06, D equal 0.12). $NQ^2$ is actually plotted versus separation time $t$, but this equivalent to varying Z. $NQ^2$ is seen to vary as the 0.7 power of $t$, which follows from the 1.4 power dependence of N on Z (equation 9) and the square root dependence of Z on $t$ (equation 4). With a solvent run of 15 cm. (a typical situation), $NQ^2$ is equal to 144 effective plates.

MULTIPLE DEVELOPMENT TLC

In this technique the $R_F$ value of the band pair is lowered below the usual value of 1/3 as shown in the following table.

TABLE 1

Optimum $R_F$ Values in Multiple Development

| Number of developments: | $R_F$ (single development) |
|---|---|
| 1 | .33 |
| 2 | .29 |
| 3 | .26 |
| 5 | .22 |
| 10 | .16 |

The fractional distance migrated by the two bands (between the point of sample application and the solvent front) $\bar{L}_i$ after $i$ developments is equal to $1-(1-R_F)^i$. The value of H during the $i$th development $H_i$ is given by equation 6, with $z_o$ given by the band position at the beginning of the $i$th development (rather than the initial point of sample application). The average value of H for the whole separation is then given by equation 5. Resulting values of $NQ^2$ for multiple development are plotted in FIG. 11 as circles with the total number of developments indicated inside the circles. The experimental conditions are the same we assumed for normal TLC, with Z constant at 15 cm. We see that the value of $NQ^2$ attainable within a given time is similar to that obtainable in normal TLC with a longer solvent run. The initial $R_F$ values assumed for each multiple development case of FIG. 11 are those given in Table 1. These values are the optimum values (for maximum resolution) derived with H assumed constant throughout separation as discussed in "Principles of Adsorption Chromatography," supra. For the actual case of H varying during separation, these optimum $R_F$ values are shifted upward by 0.01–0.02 units, but the resulting increase in $NQ^2$ is only 1–2%. That is, this correction is not significant in practice.

CONTINUOUS DEVELOPMENT TLC

Here the $R_F$ value of the band pair is again lowered below the optimum value of 1/3, and the band pair is caused to migrate all the way across the plate. This requires continuous removal of solvent from the solvent front after the front has reached the end of the plate, and this can be achieved in several ways—by solvent evaporation, capillary attraction by insertion of the plate end into a mass of dry adsorbent, etc. We can assume that separation prior to arrival of the solvent front at the plate end is described by the same equations as for normal TLC. Following this point we will assume that the solvent velocity remains constant throughout the balance of separation ($v$ equal $k/2Z$), with H during this part of the separation calculable from equation 3a. The average value of H for the entire separation is then calculable from equation 5, with H during the initial development (before arrival of the solvent front at the plate end) given by equation 6. Using this approach, which is the same as that used in the preceding examples, we calculate the resulting $NQ^2$ values of FIG. 11 for continuous development at several plate lengths Z of 5, 10, 20 and 30 cm. for curves 27, 28, 29 and 30 respectively. The $R_F$ values assumed in each of these calculations are indicated as ticks on the various curves ($R_F$ equal 0.5, 0.4, 0.3, 0.2 and 0.1 in the direction of increasing $t$). These calculations show a modest increase in $NQ^2$ per unit time for continuous development relative to normal TLC with variable Z. The maximum increase is about 30% for $R_F$ equal about 0.25. The experimental conditions assumed (D and K) are the same for all the examples of FIG. 11.

In accordance with one embodiment of this invention, employed for illustration (or an equivalent experimental variant) the solvent advances some distance Z from the source to a point past the band pair A and B. At this point the adsorbent advance rate, or, in this case, the drum rotation rate, is set equal to the rate of band migration. Solvent is continuously removed at the solvent front so as to maintain Z constant, and a steady state condition is maintained for the balance of the separation. The calculation of resolution in this procedure is straightforward. We can ignore the time and resolution involved in the initial separation before steady state operation is achieved. It is not difficult to calculate resolution exactly (i.e., taking into account the initial part of the separation). Equation 5 is used in the same way as previously. However, for the case of $Z=3$ cm., curve 32 of FIG. 11, the use of equation 5 to account for initial effects results in $NQ^2$ values which are identical with those shown in FIG. 11 for values of $t$ greater than 1000 seconds. The total distance L migrated by the band pair is equal to $R_F vt$, with $v$ given by equation 4a. The total number of plates N developed during separation is then $L/H$, with H given by equation 3a. Combining these various relationships then gives $$N=\left(\frac{k^{0.6}}{2^{0.6}D}\right)(t/Z^{0.6}) \quad (10)$$

Effective plates $NQ^2$ are then given as N times $$R_F(1-R_F)^2$$

$$NQ^2=(k/2)^{0.6}/D[R_F(1-R_F)^2(t/Z^{0.6})]. \quad (10a)$$

As in the case of normal elution, maximum resolution is obtained for $R_F$ equal 1/3. Values of $NQ^2$ for this invention at several different Z values are shown in FIG. 11. The potential advantage of adsorbent advance TLC over previously discussed techniques is clearly evident, particularly for difficult separations. Thus a separation requiring 2000 effective plates would require over a day by continuous TLC, versus a few hours by drum TLC. More difficult separations ($NQ^2>2000$) are probably not practical by any technique other than the one herein discussed.

CENTRIFUGAL TLC

This little-used technique has the potential for greater resolution per unit time than normal TLC, because of the acceleration of solvent migration rates by centrifugal action. However, its performance in practice is likely to offer only marginal advantages over normal TLC, with poorer separations than are possible by adsorbent advance chromatography. This plus its experimental complexity accounts for its limited application.

Figure 12:
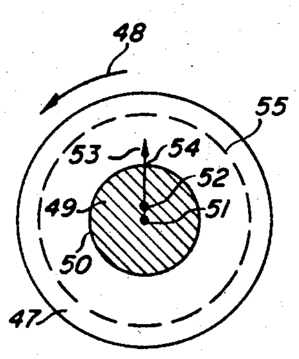
FIG. 12 PRIOR ART
FIGS. 12 and 13 are schematic illustrations of two forms of centrifugal TLC with circular development and normal linear development, respectively.
Figure 13:
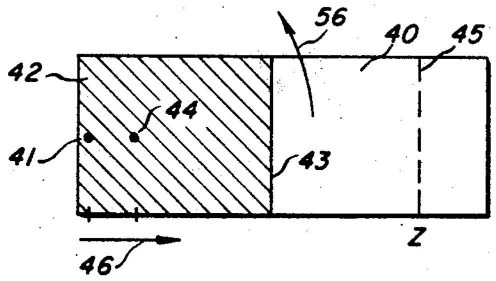
FIG. 13 PRIOR ART

Centrifugal TLC can be carried out in either of two ways: radial TLC with circular development, or normal linear development. Both types of centrifugal TLC are illustrated in FIGS. 12 and 13. In the circular development centrifugal TLC illustrated in FIG. 12 an adsorbent disc 47 is rotated in the direction indicated by arrow 48 around the center of the disc 51. The sample is initially positioned at a point 52 offset from the center. In operation solvent is continuously added to the center point of the disc and migrates outwardly under the influence of centripetal acceleration. Under the influence of solvent migration the sample migrates radially outwardly in the direction indicated by arrow 53 until the separation is terminated as determined by the extent of solvent migration to a predetermined radius 55.

In operation of the linear development radial TLC illustrated in FIG. 13 an elongate adsorbent sheet 40 is rotated about axis 41 in the direction indicated arrow 56. The sample is initially placed at a position on the axis of rectangular adsorbent 40 offset from the axis of rotation 41. Solvent is added at the center rotation 41 and migrates along the major axis of adsorbent 40 in the direction indicated by arrow 46 under the influence of centripetal acceleration. As in the other forms of TLC the solvent migration carries sample 44 along the axis of adsorbent 40 thereby separating the sample into its several components. The separation is terminated after the solvent has migrated to a predetermined point 45.

The calculation of resolution ($NQ^2$) in radial centrifugal TLC is quite complicated, compared to the case of linear centrifugal TLC. Rather than undertaking this lengthy analysis, it is more expedient to demonstrate that linear centrifugal TLC is of limited advantage, and that the radial technique is even less promising.

A centrifugal force in centrifugal TLC is essentially similar to a pressure in column chromatography.

In linear centrifugal TLC (FIG. 13) there is an outward force acting on each element of solvent $dm$, equal to $$dF=\omega^2 z dm$$

Substitution of $\rho dV$ for $dm$, and expressing $dV$ as $Adz$ then gives $$df/A=A\rho\omega^2 z\, dz$$

At any point during the separation (for a given volue of $z_s$) the pressure P acting upon the entire liquid mass is given as the integral of $dF/A$ *from* $z=0$ to $z_s$:

$$P=\rho\omega^2\int_0^{Z_s} z dz$$
$$=\rho\omega^2 z_s^2/2. \quad (11)$$

The average value of H during centrifugal migration of the solvent front from $z'$ to $z_s$ (see preceding discussion of centrifugal TLC) is then given by eqn. 5. Here $z_s$ refers to the distance of the solvent front from the solvent feed point at that time. $\rho$ is the solvent density (g./ml.) and $w$ is the angular velocity of the adsorbent bed (radians/sec.). As a result of this pressure we have a corresponding solvent velocity $v$ at this point given by $$v=KP/z_s$$
$$=K\rho\omega^2 z_s/2. \quad (12(a))$$

K is a column permeability (cm. $^4$/atm.-sec.); see (2). Equation 12a predicts that there is no initial pressure acting on the solvent when $z_s=0$. The initial migration of solvent is the result of normal capillary filling, with $v$ initally given by equation 4a. Only when $v$ from equation 12a exceeds that given by equation 4a does centrifugal action become important. The point on the chromatogram $z'$ (value of $z$; see FIG. 13) where this transition from capillary migration to centrifugal migration occurs is derivable by setting $v$ from these two equations equal:

$$z'=(k/K\rho\omega^2)^{1/3}. \quad (12(b))$$

We can now calculate H for a centrifugal TLC separation from equation 5, using values of H from equation 6 (normal TLC) for $z\geqslant z'$ and values of H from equations 3a and 5 (centrifugal TLC) for $z\geqslant z'$. This in turn permits the calculation of $NQ^2$ as in previous examples. Separation time in centrifugal TLC is calculated in a similar manner, as the sum of times for normal development plus centrifugal development.

Figure 14:
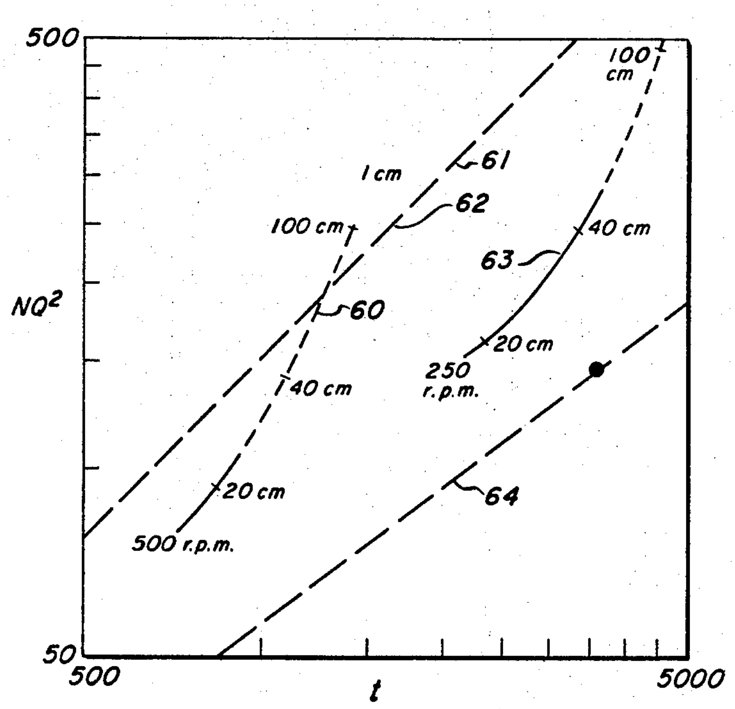
FIG. 14 is a plot of the equivalent effective plates obtained in centrifugal TLC, adsorbent advance TLC, and normal TLC versus separation time.

We can assume a typical value of K for a standard TLC adsorbent ($k$ equal 2.0 cm.$^2$/atm.-sec. for $d_p$ equal 20$\mu$; (2), a value of $\rho$ equal to 1, and other parameters (D, $k$) as previously. This then permits us to calculate $NQ^2$ in linear centrifugal TLC as a function of rotation speed and plate length. FIG. 14 shows the results of some calculations of this type. Calculated curves 60 and 63 are for 250 and 500 r.p.m., respectively. Several plate lengths are indicated on each curve. As previously, $NQ^2$ is plotted versus time, with plots for normal TLC and adsorbent advance TLC (1 cm.) superimposed as dashed lines 64 and 61, respectively. The solid lines for centrifugal TLC are for overall pressures (equation 12) less than 1 atm. The dashed portions of these curves extend to higher pressures. Since these centrifugal pressures represent a pull on solvent initially entering the plate (rather than a push as in column chromatography), pressures greater than 1 atm. are reasonably expected to lead to breaking of the solvent column and mixing of air with solvent at the point of solvent introduction. Decreased solvent leading over the entire adsorbent bed would also be expected. It is doubted that useful separations can be carried out at centrifugal pressures approaching one atmosphere.

Apart from the problem of an upper limit on centrifugal pressure, the plots of FIG. 14 show that centrifugal TLC does offer the possibility of improved separations relative to normal TLC. If we exclude the dashed regions of the centrifugal TLC curves 60 and 63, however, and recognize that slower bed rotation rates ($\omega$) lead to performance which approaches that of normal TLC, i.e., for $w$=100 r.p.m., $z'$ is equal to 85 cm. This means that centrifugal TLC is about the same as normal TLC for plate lengths, less the 85 cm. then the maximum effective plates ($NQ^2$) provided by centrifugal TLC is about 300. Thus this technique does not offer the promise of very efficient separation. However, it does offer more rapid separations than normal TLC in some applications. For all but extremely rapid separations, the methods of this invention have a decisive edge over centrifugal TLC.

Radial TLC relative to normal TLC provides solvent migration rates that are always slower than linear centrifugal TLC. This occurs because much larger volumes of solvent are required to maintain moderate solvent velocities near the solvent front. Because the solvent is forced to flow through the central construction, the advance of the front is therefore slower. As a result we expect resolution per unit time in any radial technique to be less than that in corresponding linear development. For this reason radial centrifugal TLC should be poorer (with respect to $NQ^2$ per unit time) than the curves shown in FIG. 14.

Figure 15:
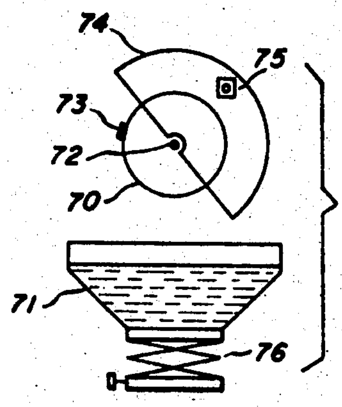
FIGS. 15 through 17 are schematic illustrations of one form of apparatus presently preferred for effecting the concept of this invention.
Figure 16:
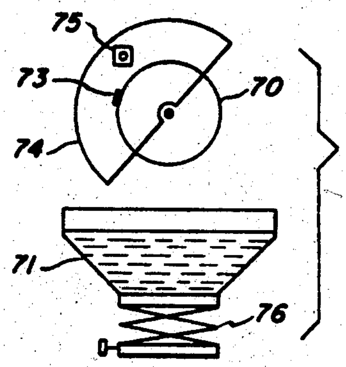
Figure 17:
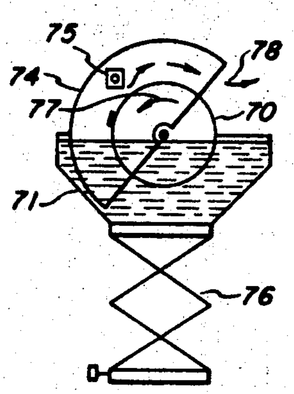

A simplified version of one form of apparatus which can be employed to effect in the concept of this invention is illustrated in FIGS. 15 through 17. In this embodiment the adsorbent layer is constructed as a drum 70 positioned on driven axis 72 and covered with hood 74 to provide a relatively stationary vapor phase. Prior to commencement of the separation the solvent bath 71 suspended on elevating means such as jack 76 is positioned below and out of contact with drum 70. Immediately prior to commencement of the separation sample 73 is positioned on drum 70 at a predetermined location slightly above the level subsequently established by raising solvent bath 71 into contact with drum 70. Hood 74 is next rotated over the point of sample application as illustrated in FIG. 16. The solvent bath is then raised into contact with drum 70 by extending jack 76 as illustrated in FIG. 17. As previously described, in the preferred embodiment, the solvent is first allowed to raise gradually into contact with and preferably slightly beyond sample 73. Following the desired extent of solvent rise, drum 70 is rotated in the direction indicated by arrow 77 so that the adsorbent is gradually passed downwardly into the solvent bath. The rate of rotation is preferably such that one or more components of the sample is retained on that portion of the adsorbent drum 70 located between the point of solvent addition determined by the level of solvent bath 71 and the point of solvent removal determined by the level at which solvent removal means 75 is positioned.

The solvent can be removed at a point on the adsorbent above the sample elevation and above the point of solvent addition by any one of several means such as evaporation or adsorption. In FIG. 17 the solvent is removed by contacting the adsorbent with a stream of vaporizing gas indicated by arrow 78 projected onto the surface of the adsorbent by air injection means 75. Numerous other alternatives are available. For example, the adsorbent drum 70 can be fabricated out of a relatively gas permeable adsorbent material such that vaporizing gas directed onto the adsorbent can be passed therethrough either from the outside in or inside out.

Several operations were conducted on an apparatus such as that described above. The drum was constructed of 6-inch diameter stainless steel tubing. The drum drive train consisted of a Bodiene NSH-12R shunt wound reversible DC motor with an internal gear ratio of 1,120:1 operating through an Insco Model 00104 gear box with gear ratios of 1:1 to 128:1. Power was supplied to the motor through a Minarek Model W-14 full wave speed control manufactured by Marinek Electronics, Los Angeles, Calif. This arrangement enabled variation of rotation rates from 0.0006 to 2.9 r. p. m. A fixed gear ratio of 128:1 with this system would provide a range of 0.006 to 0.02 r.p.m. which would be more than sufficient to accommodate all useful values of Z and most solvents. Drying block 75 illustrated in FIGS. 15, 16 and 17 was machined to provide a gas jet slot of 0.030 inches and during operation was positioned a few thousandths of an inch from the drum surface to provide intimate contact of drying gas, in this instance air, with the adsorbent material. Flexible adsorbent sheets were then cut to accommodate the dimensions of the drum and securely fastened. In other embodiments of this invention it is desirable to employ adsorbent cylinders which exactly accommodate the dimensions of the drum. This variation is particularly desirable when the drum is to be rotated through more than 360° during a single separation. By this procedure the adsorbent is reused during a single separation by recycling at least a portion of the adsorbent past the levels of solvent addition and removal. Exemplary of suitable flexible chromatograph sheets are the commercially available Eastman Kodak and Baker silica sheets.

During the examples hereinafter detailed, the drum was immersed in the solvent bath after spotting the sample thereon as shown in FIGS. 15–17. Drum rotation was commenced after the solvent had migrated upwardly to an extent sufficient to just cover the sample spot. Drier air flow rate was maintained at 50 to 100 milliliters per minute. Initially, after commencement of drum rotation, it was necessary to adjust the rotation rate of the drum frequently to assure that the several sample component bands were maintained above the solvent level and were prevented from moving upwardly into the drying region. This is easily accomplished by the provision of a variable speed drive for the adsorbent drum and viewing the location of the sample bands through a transparent portion of vapor hood 74. However, once the solvent front reached the drying zone, the flow became constant and only an occasional adjustment of rotation rate was required to maintain the sample bands in relatively stationary positions. Reagent grade acetone, benzene and hexane, purified by passing through silica gel, were used as solvents. The multicomponent samples employed in the separations comprised mixtures of several dyes; Koppers Oil Yellow II, American Aniline Oil Fast Heliotrope R, and Nyanza Oil Green.

Several comparative operations were conducted to demonstrate the accuracy of the aforegoing theoretical considerations of the several forms of TLC and to illustrate empirically that in fact higher resolutions, faster separations and higher sample loadings can be obtained with the concept of this invention. All of these operations were conducted with air equilibrated silica adsorbent. The comparative experiments were completed within two hours of one another to avoid differences in selectivity which might be occasioned by variation in humidity. In each experiment the sample was composed of two of the abovenoted dyes which were particularly difficult to separate in order to emphasize the differences in the various TLC procedures. A suitable dye-solvent-adsorbent system was first found using normal TLC. The same system was then developed employing the adsorbent advance TLC system of this invention. The results of each of these examples represent the first trial with the method of this invention, demonstrating the ease with which successful separations can be carried out on these units.

EXAMPLE 1

The sample employed in this example comprised equal amounts of Koppers Oil Yellow II and American Aniline Oil Fast Heliotrope R. The solvent was a 50 percent (v./v.) hexane-benzene mixture. The sample separation procedure employed was normal development TLC discussed above. After an 85 minute development time, the solvent front had migrated 18 centimeters up the adsorbent. Two bands in the sample had not even been resolved, even at approximately optimum $R_F$ values of 0.33. These results are illustrated by the graphic representation of the developed adsorbent sheet in FIG. 18. A second component of the Koppers Oil Yellow II had a markedly lower $R_F$ value and was resolved from bands A and B. These observations establish that little improvement in resolution is obtainable with these separation times and normal development TLC without changing selectivity.

EXAMPLE 2

Figure 19:
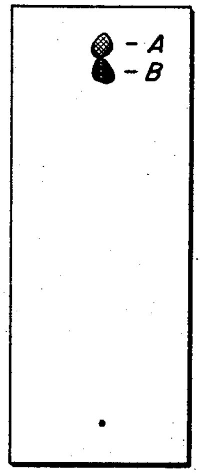

The same sample-solvent system and adsorbent employed in Example 1 were used with the drum apparatus of this invention wherein the value of Z was set at 4 centimeters. Bands A and B which were resolved in Example 1 were separated in 54 minutes as shown in FIG. 19. The higher solvent flow rates obtained with the method of this invention enables the bands to migrate almost 3 times farther in substantially less time than was possible in normal development TLC. Thus, were it not for the increased band spreading resulting from the higher flow rate, N would be 3 times greater. However, theory, previously discussed, predicts approximately 50 percent improvement in N as illustrated in FIG. 11.

Figure 18:
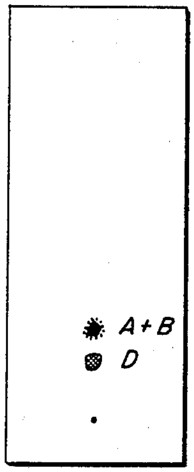
FIGS. 18 through 23 are graphic representations of the results obtained hereinafter in Examples 1 through 6.

The third band, D, observed in Example 1 and illustrated in FIG. 18 was not present on the adsorbent sheet after the completion of this operation as illustrated in FIG. 19. Although this component was present in the initial sample, its migration rate was slower than the rate of drum rotation. This component was thus passed into the solvent reservoir as a result of drum rotation and washed off the adsorbent.

EXAMPLE 3

Figure 20:
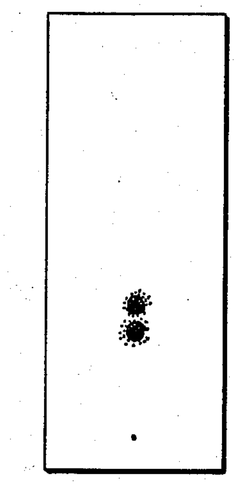

A second sample composed of a 50–50 mixture of Koppers Oil Yellow II and Nyenza Oil Green was chromatographed in the solvent-adsorbent system discussed in Examples 1 and 2. These dyes also had optimum $R_F$ values. However, selectivity of the solvent-adsorbent system for this combination of components was sufficient to afford reasonably good resolution in 57 minutes with normal development TLC as illustrated in FIG. 20.

EXAMPLE 4

Figure 21:
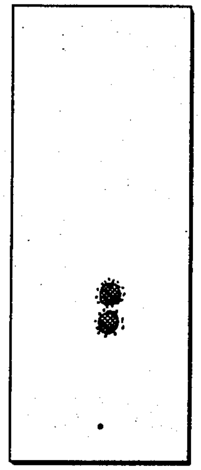

The operation of Example 3 was repeated employing the same sample composition and solvent-adsorbent system with the method of this invention. As in Example 2 the Z value of the drum adsorbent advance system was 4 centimeters. The separation was discontinued after 15 minutes which, as illustrated in FIG. 21, was sufficient to provide equal or better resolution than was obtained in 57 minutes with normal development techniques.

Quantitative analysis of these data suggests that the improvement realized with the concepts of this invention is, if anything, in excess of that predicted by theory (see FIG. 11). Better resolution than that predicted by the plots illustrated in FIG. 11 could be the result of a lower value of $n$ in equation 3 for TLC systems (corresponding to a flatter H versus $v$ plot). The variation of H with $v$ in TLC systems has not yet been determined with precision, due in part to the difficulty of compensating for variations in solvent migration rates inherent in previously available systems. However, the concepts of this invention provides a means for studying this relationship since constant velocities are attainable over a fairly wide range.

Several of the advantages inherent in the concepts of this invention, and verified empirically in the aforegoing examples, derive from the dramatic increase in solvent migration rates without gross changes in solvent profile found in centrifugal TLC systems. In one embodiment of this invention, i.e., steady state operation, solvent migration rate is determined for a given solvent-adsorbent combination by the value of Z, the distance from the solvent source to the solvent removal level. Solvent migration rate increases as a function of $Z^{-0.5}$. Because of the availability of constant, high velocity migration rates with these procedures, very extensive migration distances can be covered in a relatively short time.

One of the several further advantages of the concept of this invention lies in the area of preparative separations. Sample overloading often reduces resolution because of band tailing. This effect limits the maximum sample loading and preparative separations. However, markedly higher sample loadings can be accommodated with the methods of this invention at some sacrifice to the relatively high resolutions otherwise available. Several of these advantages are demonstrated by the following examples.

EXAMPLE 5

Figures 22, 23:
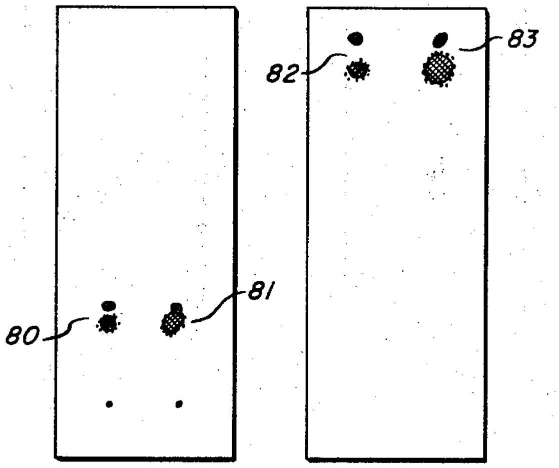

In this example the operation of Example 1 was repeated using two sample sizes—1 and 4 microliters. As illustrated in FIG. 22 overloading with the 4 microliter sample was readily apparent. The 1 microliter sample 80 was resolved into the two respective components. However, the 4 microliter sample 81 was not completely resolved.

EXAMPLE 6

The operation of Example 5 was repeated using the drum technique previously discussed in Example 2. Development was effected under the same conditions of time, solvent-adsorbent system and sample size employed in Example 5. As illustrated in FIG. 23 the 1 microliter sample 82 was completely resolved to an extent much greater than that achieved in Example 5. The 4 microliter sample 83 was also completely resolved in the methods of this invention.

The methods of this invention also offer unique capabilities in the area of separated sample component recovery. In the preparative separation of two bands, the slower moving band may be removed by adjusting the steady state position of the pair of bands such that its trailing edge (the less contaminated edge) dips into the solvent reservoir after sufficient resolution has been achieved. The result is that purified material is extracted from the back side of the spot during separation. After a sufficient quantity has been extracted. The solute could be recovered by evaporation of the solvent in the reservoir. Alternatively the faster moving band could be extracted at its leading edge if a roller of adsorbent material were used in place of the air stream for removing solvent at the front. Recovery would then be accomplished by washing the band from the roller.

The particular embodiments of this invention discussed immediately above are subject to some limitations when operating upon multicomponent samples in which several of the components have markedly different $R_F$ values, i.e., different migration rates along the adsorbent band. In such circumstances it is often the case that only a few bands can be separated at one time using the steady state technique above described at relatively small values of Z. The reason for this is that for any given rotational value only one $R_F$ value, e.g., only one sample component, remains stationary. Normally the rotational velocity is adjusted so that the center of the two most desirable bands is maintained stationary. Materials having $R_F$ values lower than this tend to move into the solvent source (as did band D in FIG. 19) while those having larger $R_F$ values move upwardly relative to the stationary point and are concentrated at the solvent front at the level of solvent removal. Since it is desirable in the use of these procedures to maintain relatively small Z values on the order of only a few centiemters, and band widths are typically about 0.5 centimeters, only a few bands of very limited $k(R_F)$ range can be simultaneously resolved. Consequently, adsorbent advance TLC, although ideally suited for the analysis of two difficult separable bands, is subject to some limitations in the analysis of broad range samples. Nevertheless, other embodiments of these concepts can be employed to mitigate the effect of these limitations.

The use of adsorbent advance TLC systems of this invention with inverse solvent programming offers some interesting possibilities for the separation of complex, multicomponent samples at high separation efficiency, i.e., large values of $NQ^2$. In such applications these procedures are competing with previously known techniques such as gradient layer TLC, vapor programmed TLC, gradient elution TLC, and the like discussed by L.R. Snyder and D. L. Saunders, J. Chromatography, *44*, 1 (1969). However, the only modifications required in the apparatus previously discussed are provisions for the introduction of solvent to the moving adsorbent, e.g., the cylindrical adsorbent drum, along a narrow line, so that washing of the drum below the solvent level does not occur as is the case when a solvent bath is employed. Solvent application might be accomplished in any one of several different ways. For example, a short adsorbent wick might be employed to communicate solvent from a slotted solvent line to the drum at a point below the level of initial sample application. Similarly, solvent could be applied by the use of a porous roller in contact with the adsorbent layer, which rotates with the adsorbent as the latter is moved. Alternatively a solvent feed line running perpendicular to the direction of travel of the adsorbent and immediately adjacent the operative face thereof could be provided with a narrow slit separated from the adsorbent by only a very nominal distance such that solvent could be fed to the adsorbent as low pressure; i.e., sufficient pressure to maintain liquid contact between the drum and feed line, without loss of solvent by downward flow.

Separation could be commenced in the manner usually employed in inverse solvent programming with an initial solvent which is strong enough to provide $R_F$ values of approximately 1 for all sample components. Thus, in the steady state operation the total sample would migrate as a single spot at the solvent front, the solvent front being controlled by solvent evaporation as in the adsorbent advance TLC techniques discussed above. An inverse solvent gradient is then applied through the feed lines, such that the $k$ values of individual sample components gradually decrease. After a predetermined period of time the most strongly adsorbing components are adsorbed sufficiently that they begin to migrate relatively backwardly toward the level of solvent application due to relative motion of the adsorbent to the levels of solvent addition and removal. The relative solvent strength continues to be reduced during this backward migration of the more strongly adsorbing components such that their $R_F$ values are reduced to the point at which they are "frozen" on the adsorbent layer and pass intact through the solvent addition level as the result of adsorbent travel. From that point on the bands thus removed undergo no further separation. By the time the first band (most strongly adsorbed) rotates around the drum to a point just above the solvent front (followed by later, less strongly adsorbed components) the separation is terminated. In the process both strongly and weakly adsorbing bands undergo essentially equivalent separation, i.e., approximately equal values of $NQ^2$, thus providing a solution to the general elution problem.

It is also interesting to note that the combination of adsorbent advance TLC of this invention and inverse solvent programming is unique in that the problems and effects of solvent demixing are completely avoided. Strongly adsorbing solvent is always displaced by more weakly adsorbing solvent. Consequently, these procedures offer the possibility of effecting separations which are fundamentally different in some respects from previously known TLC techniques.

As previously indicated, higher average solvent flow rates and shorter separation times are achieved by the procedures of this invention by minimizing the distance between the levels of solvent addition and removal. As a result, it is generally desirable that the distance between these two levels, i.e., the value of Z, be less than about ½ the solvent travel relative to the adsorbent throughout the course of the separation. In most instances it is possible and desirable to maintain the separation between the levels of solvent addition and removal at less than about 10 centimeters preferably less than about 5 centimeters. In some situations, when exact control of component separation is desired or for other reasons that render the maintenance of a constant solvent migration rate desirable, it is preferable to maintain a constant separation distance between the level of solvent addition and removal. However, where the condition of relatively constant solvent migration rate is not necessary or desirable, greater separation efficiencies and higher average solvent flow rates can be achieved by beginning the separation at a relatively small Z value and increasing the spacing between these two levels during separation. As a general rule, the degree and rate of increase in Z value during separation will be governed by the rate of separation of the sample constituents. For example, as the components of the sample begin to separate, thereby increasing the distance occupied on the adsorbent between the traveling edge of the slowest moving sample and the leading edge of the fastest moving component, the Z value can be increased proportionately such that desired sample components are not allowed to migrate to the level of solvent removal and are not moved downwardly past the level of solvent addition due to the relative motion of the adsorbent. In such instances, the initial separation of the solvent addition and removal levels can be as low as 3 centimeters or even 1 centimeter or less. However, regardless of these considerations, it generally remains true that the most efficient separation is accomplished when the relative affinities of the solvent and adsorbent for the sample constituents are such that the degree of travel of the sample constituents relative to the adsorbent is approximately ⅓ of the solvent travel relative to the adsorbent during separation. Consequently, its is presently preferred that the extent of solvent travel be about 2 to about 4 times the travel of a selected one or more sample components.

Numerous equivalent variations and modifications of the concept of this invention will be apparent to one skilled in the art in view of the aforegoing disclosure and the appended claims.

What is claimed is:

1. The method of separating a compound from a combination thereof with at least one other compound by solvent-adsorbent chromatography wherein at least two of said compounds are at least partially soluble in said solvent and at least partially adsorbed by said adsorbent and exhibit different respective distribution coefficients between said solvent and said adsorbent which method comprises contacting said adsorbent having said combination adsorbed thereon at a first level with said solvent at a second level below said first level, said solvent progressing upwardly along the length of said adsorbent under the influence of capillary action and through said first level thereby contacting said combination and carrying each of said compounds along said adsorbent at different respective rates proportional to said respective distribution coefficients for a period sufficient to separate at least one of said compounds from said combination, substantially removing said solvent from said adsorbent at a predetermined position above said first and second levels, moving said adsorbent downwardly relative to said second level at which said solvent is supplied to said adsorbent and said solvent removal level at a rate not substantially greater than the rate of upward travel of at least a selected one of said compounds in said combination whereby said selected compound is maintained at a position above said second level.

2. The method of claim 1 wherein said adsorbent is moved downwardly at a rate sufficient to maintain said selected compound below said predetermined position at which said solvent is removed from said adsorbent.

3. The method of claim 1 wherein said adsorbent is moved downwardly at a rate sufficient to maintain at least two of said compounds between the level at which said solvent is added to said adsorbent and the level at which said solvent is removed from said adsorbent and said separation is continued for a period sufficient to substantially completely separate said two compounds.

4. The method of claim 1 wherein the distance between the level at which said solvent is removed from said adsorbent and said second level at which said solvent is applied to said adsorbent is equivalent to less than one-half the total travel of said solvent relative to said adsorbent during said separation.

5. The method of claim 1 wherein said adsorbent is moved downwardly relative to said solvent addition level and said solvent removal level at a rate sufficient to maintain at least two of said compounds below said solvent removal level and above said solvent addition level, said separation is continued for a period sufficient to substantially separate at least said two compounds retained between said two levels, and the distance between said two levels is less than one-half the travel distance of said solvent relative to said adsorbent during said separation.

6. The method of claim 1 wherein said solvent addition level is defined by the level of a solvent bath in which said adsorbent is partially immersed and into which said adsorbent is passed during said separation, and said solvent is substantially removed from said adsorbent by intimately contacting said adsorbent at said solvent removal level with a vaporizing gas under conditions sufficient to substantially evaporate said solvent.

7. The method of claim 1 wherein said adsorbent comprises a continuous endless strand of adsorbent material partially immersed in a solvent bath and continuously passed into and out of said solvent bath during said separation.

8. The method of claim 7 wherein said adsorbent is reused during said separation by recycling said adsorbent past said levels of solvent removal and addition.

9. The method of claim 1 wherein said adsorbent comprises a continuous endless strand of adsorbent material and the total travel of said adsorbent relative to said solvent addition level exceeds the length of said adsorbent strand whereby said adsorbent is at least partially recycled during said separation past said solvent addition level.

10. The method of claim 1 wherein the distance between said levels of solvent addition and solvent removal is less than about 10 cm. and said travel of said solvent relative to said adsorbent is in excess of said distance between said levels of solvent addition and removal.

11. The method of claim 1 wherein the distance between said levels of solvent addition and removal is less than about 5 cm. and the total effective travel of said solvent relative to said adsorbent during said separation is substantially in excess of said distance between said levels of solvent addition and removal.

12. The method of claim 1 wherein the extent of said solvent travel relative to said adsorbent is about 2 to about 4 times as great as the total travel of said combination relative to said adsorbent.

13. The method of claim 1 wherein the distance between said levels of solvent addition and removal is proportional to the distance between the leading edge of a faster moving compound and the trailing edge of a slower moving compound retained between said respective levels thereby maintaining at least about the smallest tolerable distance between said respective levels and at least about the highest obtainable solvent travel rate relative to said adsorbent during said separation.

14. The method of claim 1 wherein said distance between said levels of solvent addition and removal is maintained substantially constant during said separation and the rate of said solvent travel relative to said adsorbent is relatively constant during said separation.

15. The method of claim 1 wherein said sample contains at least two compounds soluble in said solvent having different relative distribution coefficients between said solvent and said adsorbent and said distance between said levels of solvent addition and removal is increased during said separation as two of said compounds are separated such that said solvent removal level is beyond the leading edge of the fastest moving of said compounds thereby maintaining a higher average solvent travel rate relative to said adsorbent during said separation.

16. The method of claim 15 wherein said level of solvent addition is moved upwardly relative to said adsorbent in the direction of solvent flow during said separation at a rate proportional to the migration rate of a slower moving compound and said level of solvent removal is moved upwardly relative to said adsorbent in the direction of solvent flow at a rate proportional to the travel rate of a faster moving compound such that said solvent removal level is maintained beyond the leading edge of said faster moving compound and the distance between said solvent addition level and said solvent removal level is increased during said separation.

17. The method of claim 16 wherein said distance between said solvent addition level and said solvent removal level is initially less than about 3 cm. and is increased during said separation as the distance between said compounds is increased by relatively withdrawing said solvent removal and solvent addition levels from each other at a rate sufficient to maintain said compounds between two respective levels said rate being less than the travel rate of said solvent addition level.

18. The method of separating at least one compound from a combination thereof with at least one other compound by solvent adsorbent chromatography wherein at least two of said compounds are at least partially soluble in said solvent and at least partially adsorbed by said adsorbent and have different respective distribution coefficients between said solvent and said adsorbent whereby said respective compounds progress along said adsorbent at different relative rates under the influence of solvent travel along said adsorbent imposed as hereinafter detailed, which method comprises contacting said adsorbent in the form of an elongate adsorbent path having said sample adsorbed thereon at a first level with said solvent at a second level below said first level whereby said solvent progresses upwardly along the length of said adsorbent by capillary action and through said first level thereby carrying said compounds along said elongate adsorbent path at different relative rates for a period sufficient to separate at least one of said compounds from the remainder of said combination, substantially removing said solvent from said adsorbent at a predetermined position above said solvent addition level, substantially continuously moving said adsorbent downwardly relative to said solvent addition level in the direction opposite the direction of solvent travel at a rate not substantially greater than the rate of upward travel of a selected compound whereby at least said selected compound is retained on said adsorbent between said first and second levels and the distance between said first and second levels is less than about one-half the total travel of said solvent relative to said adsorbent during said separation.

19. The method of claim 18 wherein said solvent addition level is defined by the level of a solvent bath into which said adsorbent is partially immersed and said solvent is substantially removed from said adsorbent by evaporation at said solvent removal level.

20. The method of claim 18 wherein said adsorbent comprises a continuous endless strand of adsorbent material, said adsorbent is at least partially immersed in a solvent bath and is passed into and out of said solvent bath during said separation.

21. The method of claim 20 wherein said adsorbent is reused during said separation by recycling at least a portion of said adsorbent past said first and second levels.

22. The method of claim 18 wherein the distance between said levels of solvent addition and removal is less than about 10 cm. and said travel of said solvent relative to said adsorbent is in excess of said distance between said solvent addition and removal levels.

23. The method of claim 22 wherein the travel of said adsorbent during said separation relative to said solvent addition level is at least about twice the distance between said levels of solvent addition and removal.

24. The method of claim 18 wherein the extent of said solvent travel relative to said adsorbent is about 2 to about 4 times as great as the total travel of said selected compound relative to said adsorbent.

25. The method of separating at least one compound from at least one other compound in a sample containing said compounds by solvent adsorbent chromatography wherein at least two compounds in said sample are at least partially soluble in said solvent and at least partially adsorbed by said adsorbent and have different respective distribution coefficients between said solvent and said adsorbent whereby said respective compounds progress along said adsorbent at different relative rates under the influence of solvent travel relative to said adsorbent which method comprises adding solvent to said adsorbent in the form of an elongate adsorbent path at a solvent addition level and passing said solvent upwardly along said elongate adsorbent path under the influence of capillary action into contact with said compounds disposed on said adsorbent, removing said solvent from said adsorbent at a second level above the location of said compounds on said adsorbent, carrying each of said compounds upwardly along said elongate adsorbent path under the influence of said solvent travel at different respective rates proportional to the differences in the said respective distribution coefficients for a period sufficient to separate at least one of said compounds from the remainder of said sample, moving said adsorbent downwardly relative to said solvent addition and removal levels at a rate not substantially greater than the upward travel rate of at least a selected compound and maintaining said selected compound between said solvent addition and removal levels, the travel of said adsorbent relative to said levels during said separation being less than about one-half the total travel of said solvent relative to said adsorbent and the distance between said levels of solvent addition and removal is less than about 10 cm.

26. The method of claim 25 wherein said adsorbent comprises a continuous endless strand of adsorbent material and said adsorbent is at least partially reused during said separation by recycling at least a portion of said adsorbent past said solvent addition and removal levels.

27. The method of claim 25 wherein at least two compounds are retained between said solvent addition and normal levels, the initial distance between said solvent addition and removal levels is less than the distance between the fastest and slowest of said compounds at the termination of said separation and said distance between said levels is gradually increased during said separation at a rate proportional to the differential travel rate of said fastest and slowest compounds retained between said levels.

28. The method of claim 27 wherein the initial distance between said levels of solvent addition and removal is less than about 5 cm.

29. The apparatus of claim 28 wherein the distance between said first level and said second level is less than about one-half the distance travelled by said adsorbent strand during said separation.

References Cited

UNITED STATES PATENTS

| | | | |
|---|---|---|---|
| 3,635,345 | 1/1972 | Rodder | 210—198 C |
| 3,666,105 | 5/1972 | Fox | 210—198 C |
| 3,503,712 | 3/1970 | Syssman | 210—198 C X |
| 3,511,775 | 5/1970 | Collins | 210—198 C X |

JOHN ADEE, Primary Examiner